March 1, 1932.                J. B. TAYLOR                1,847,636
            VIBRATION RECORDING AND REPRODUCING APPARATUS
                          Filed Nov. 28, 1927
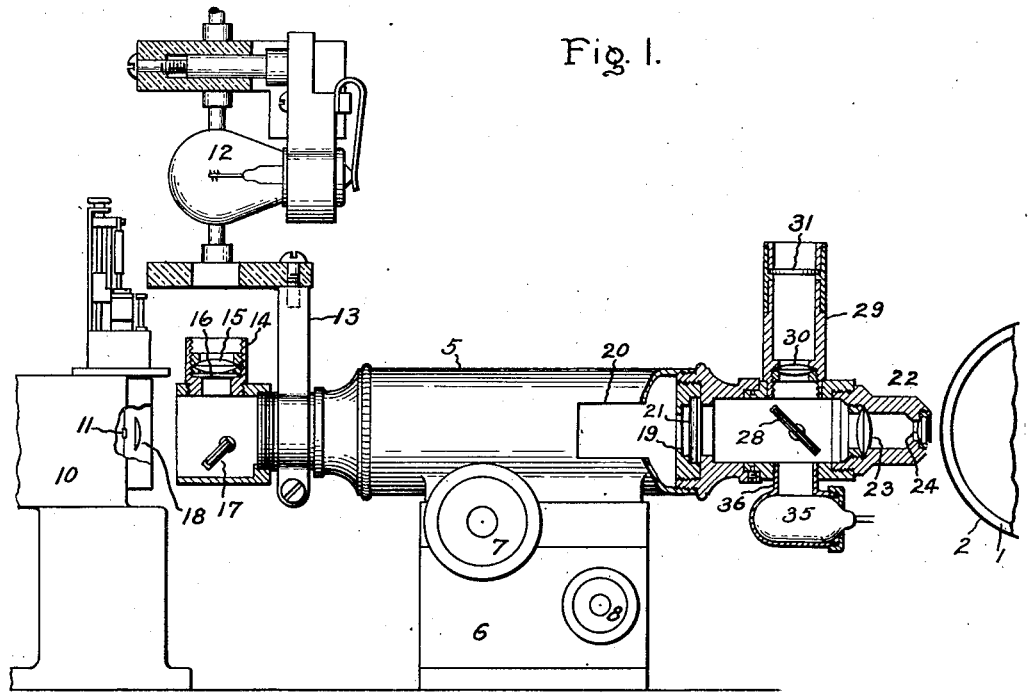
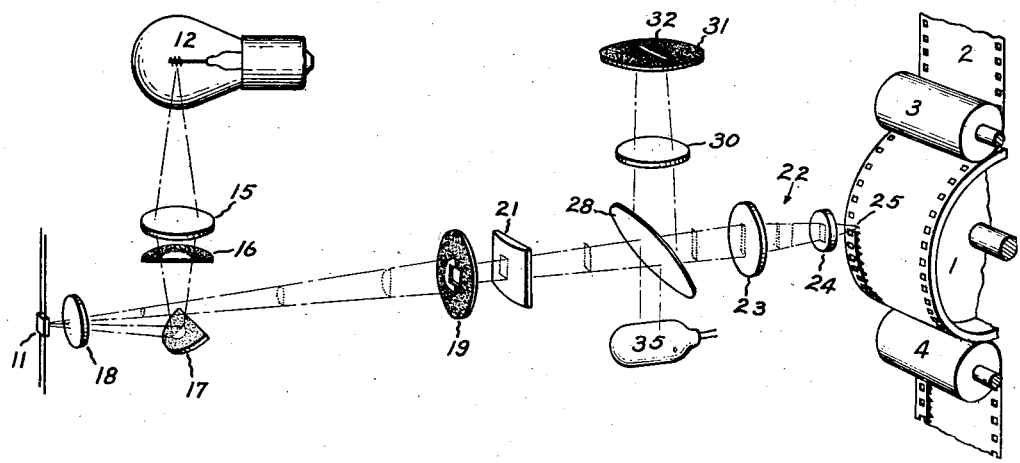
Inventor
John B. Taylor,
by
His Attorney.

Patented Mar. 1, 1932

1,847,636

UNITED STATES PATENT OFFICE

JOHN B. TAYLOR, OF SCHENECTADY, NEW YORK, ASSIGNOR TO GENERAL ELECTRIC COMPANY, A CORPORATION OF NEW YORK

VIBRATION RECORDING AND REPRODUCING APPARATUS

Application filed November 28, 1927. Serial No. 236,045.

My invention relates to apparatus for photographically recording vibrations on a light sensitive member and to apparatus for reproducing vibrations from a record thereof. My invention relates particularly to apparatus for making the photographic record in the form of a band on a moving film by means of a beam of light which is caused to vary in accordance with the vibrations to be recorded. For the faithful recording of vibrations having relatively high frequencies, such for example as are represented by the overtones in certain sound waves, and for the true reproduction of such vibrations previously recorded, for example, on a film it has been found that with moderate film speeds the light beam employed in either case must be extremely narrow where it engages the film. In apparatus heretofore constructed, a beam having the necessary narrowness usually has been obtained by the use of a screen having an aperture therein of the order of one mil in width arranged close to the moving film. Arrangements also have been proposed wherein a screen displaced from the film and having a larger aperture is used and by the use of suitable lenses a reduced image of the aperture is formed on the film. With such forms of apparatus I have found it difficult in certain cases to obtain sufficient light intensity on the film and where an aperture of microscopic width is used close to the film many other difficulties are met with in the construction and the operation of the apparatus. It is an object of my invention, therefore, to provide improved apparatus of this character which shall avoid difficulties experienced in the construction and use of former apparatus, shall be efficient and shall include means which facilitate the adjustment and use of the apparatus.

In accordance with one feature of my invention I dispense with the use of narrow apertures either arranged close to the moving light sensitive member or at a distance therefrom and employ optical means for bending the rays from a suitable light source to form a line of light on the light sensitive member having the desired intensity and the desired narrow width.

My invention will be better understood from the following description taken in connection with the accompanying drawings, and its scope will be pointed out in the appended claims.

Referring to the drawings, Fig. 1 is a side elevation, partly in section, of apparatus involving my invention and Fig. 2 shows the optical system of the apparatus.

Certain features of my invention relate to apparatus for making a photographic record on a moving light sensitive member while other features relate both to such apparatus and to apparatus for reproducting vibrations previously recorded. In the drawings illustrating my invention, I have shown apparatus for recording electrical vibrations on a moving film by means of an oscillograph galvanometer. This apparatus is of the type wherein by optical means a line of light is focused on the film as distinguished from the type employing a mechanical slit or light aperture arranged close to the moving film. On the drawings I have shown the film supported on the face of a rotatable drum. Such a drum I have shown at 1, the film 2 as seen in Fig. 2, passing between the drum and the idlers 3 and 4. Tube 5 carrying the main portion of the optical system is adjustably mounted on the base 6 whereby it may be given the various movements necessary to properly position the line of light on the film. I have shown only the adjusting screws 7 and 8 for effecting respectively the coarse and fine adjustment of the tube longitudinally. Adjacent the end of the tube 5 further from the film is the oscillograph galvanometer 10 having the small mirror 11 and having means for effecting various adjustments thereof. In use, the oscillograph galvanometer is electrically connected with a source of electrical vibrations to be recorded. If the apparatus is to be used to record sound, a sound pick-up device, such for example as a condenser microphone, may be connected to the oscillograph galvanometer preferably through a suitable amplifying device. The source of light comprising the incandescent lamp 12 is shown mounted on one end of tube 5 by means of the bracket 13, suitable adjustments being provided for properly positioning the lamp. In the lateral branch 14 of tube 5 is the lens 15 and the diaphragm 16, the latter, as shown more clearly in Fig. 2, having a straight edge whereby a portion of the light beam from lens 15 is shut off. The purpose of the diaphragm is to give a sharp edge to that part of the light beam which finally reaches the film. Below the lens and diaphragm and offset from the center of the tube 5 is the adjustable mirror 17 set at approximately 45° so as to reflect the light beam to the oscillograph mirror 11. I have shown this mirror 17 semicircular in shape, this form being used for convenience in avoiding interference with the beam after reflection from the oscillograph mirror. I have also shown the lens 18 mounted immediately in front of the oscillograph mirror through which lens pass both the incident and the reflected beams. To facilitate the proper positioning of the beam of light reflected from the oscillograph mirror, I have shown the target 19 having a square opening therein mounted near the other end of the tube and for observing the position of the beam on the target a suitable opening 20 is provided in the wall of the tube. Adjustments are made to bring the straight side of the bright spot corresponding to the sharp edge of the beam approximately at the middle of the opening in the target. That portion of the beam which passes through the target first traverses the cylindrical lens 21 which is arranged with its axis vertical or at right angles to the vibratory movement of the beam. Beyond the cylindrical lens 21 is the lens system 22 shown as comprising lenses 23 and 24 which in cooperation with the cylindrical lens 21 arranged in the manner described refract the rectangular light beam passing the target into a beam which focused on the film, produces a very narrow bright line of light 25. The lens system 22 would focus the beam to a point-like spot on the film; the cylindrical lens 21 spreads the spot transversely of the film to a line of light. As the beam is vibrated in response to vibrations of the mirror 11, the length of the bright line 25 varies accordingly, the end of the line which moves being sharply defined whereby as the film advances with a steady movement it is exposed in a manner to form a serrated edge record thereon. For the lens system 22 I have found it convenient to employ a microscope objective, of suitable equivalent focus and numerical aperture, with which a bright line of the required length and having a width of 1 mil, more or less, is readily obtained.

For the purpose of better enabling the operator to focus and position the line of light on the film I have provided the apparatus with means for viewing a magnified image of the light line. In the present embodiment of my invention, I have shown within the tube 5 and between the cylindrical lens 21 and the lens 23 a thin piece of glass 28, such as a piece of cover glass, arranged at an angle approximately of 45° and opposite this glass in a branch tube 29 I have shown the lens 30 and the screen 31 which for example may be a piece of ground glass. A certain small portion of the light reaching the film in the light line 25 will be reflected from the film surface and a part of this reflected light after passing back through the lens system 22 is partly reflected by the inclined glass 28 through the lens 30 on the screen 31 where it forms an enlarged image 32 of the light line 25 on the film.

Such an enlarged image of the light line is of great assistance to the operator. It enables him continuously to check and maintain the proper focus and position of the light line during the process of recording and it provides a constant visual indication of the deflection amplitude and of the film action as for example the presence of film on the drum or the absence thereof due to running out of breakage. A reference line or lines scratched or otherwise marked on the screen 31 facilitate the quick and accurate adjustment of the apparatus to properly position the light line on the film.

While I have illustrated my invention as comprising an arrangement for making a serrated edge or variable width record it is not limited to the making of such records but is also adapted for making records of the constant width variable density type. If such a record is to be made the oscillograph galvanometer will be rotated 90° so as to assume a horizontal position in the form illustrated and the diaphragm will be rotated 90° on the axis of the light beam passing therethrough. With the construction illustrated it may be found more desirable to rotate the entire assembly including the lamp 12, lens 15, diaphragm 16 and mirror 17 instead of the diaphragm only. This will rotate the beam reaching the target 19 through 90° and cause it to vibrate in a vertical plane, thereby varying the amount of light passing through the target to the film. The length of the light line 25 now remains constant but the brightness of the line varies with the deflections of the oscillograph mirror whence the film is exposed in a band of constant width and variable intensity longitudinally.

For monitoring the recording operation, particularly where sound is being recorded the operator may be provided, for example, with a head set connected in circuit with the oscillograph galvanometer or with the sound pick-up device. Ths, however, does not take into account the operation of the oscillograph galvanometer and the optical system. I have provided therefore a monitoring device comprising the photo-electric cell 35 arranged at the end of the lateral tube 36 opposite the tube 29 and the glass 28. Although most of the light beam which is vibrated by the oscillograph mirror and which passes through the target 19 will pass on through the glass 28 to the film a certain small proportion of it will be reflected laterally into the cell 35. By connecting the cell to the operator's telephone preferably through a suitable amplifying device he is able to supervise the operation of the entire apparatus by hearing and judging the intensity and quality of the musical or other sounds being recorded.

While I have shown and described my invention as comprising a recording apparatus, certain portions thereof, namely, the optical system including the cylindrical lens 21 and the lens system 22 and also the apparatus for viewing the light line, are also applicable for use in a reproducing apparatus. In the latter case it is understood that the light beam is not vibrated and a suitable photo-electric cell is arranged behind the film whereby the amount of light reaching the cell is controlled by the record on the film.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:—

1. Apparatus for recording vibrations on a moving light sensitive member comprising a source of light from which a beam is directed toward said member, means for vibrating said beam transversely of the movement of said member in accordance with the vibrations to be recorded, means in the path of said beam adapted to focus the beam to a point-like spot of light on the member and means for spreading the beam to form in cooperation with the focusing means a thin line of light on the member.

2. Apparatus for recording vibrations comprising a light sensitive member supported for longitudinal movement, a source of light, means responsive to said vibrations for vibrating a beam from said source transversely of the movement of said member, and means comprising a cylindrical lens having its axis at right agles to the direction of movement of the beam for bending the rays of the beam to form a narrow transverse line of light on said film.

3. Apparatus for recording vibrations comprising a film supported for longitudinal movement, a source of light, means responsive to said vibrations for directing a beam from said source toward said film and for vibrating the beam transversely of said film movement, a cylindrical lens arranged in said beam having its axis extending in the direction of the movement of the film, and a reducing lens system between the film and the cylindrical lens.

4. Apparatus for recording vibrations comprising a light source, a mirror adapted to be vibrated in accordance with the vibrations to be recorded, means for directing a beam of light from said source on said mirror, a diaphragm arranged to give the beam a sharp edge at one side thereof, a film supported for longitudinal movement in a direction at right angles to the vibratory movement of the light beam reflected from said mirror, and means comprising a cylindrical lens having its axis extending in the direction of the film movement for bending the rays of said reflected light beam to form a narrow transverse line of light on the film.

5. Film sound recording apparatus comprising a light source, an oscillograph galvanometer having a mirror adapted to be vibrated in accordance with the sound waves to be recorded, a mirror for directing a light beam from the source to the oscillograph galvanometer mirror, a diaphragm arranged to give the beam a sharp edge at one side thereof, a lens arranged close to the oscillograph galvanometer mirror through which pass the incident and reflected beams, a film, a drum for supporting and moving the film longitudinally at right angles to the vibratory movement of the reflected beam, and means for refracting the rays of the reflected beam to form a narrow transverse line of light on the film, comprising a cylindrical lens having its axis at right angles to the direction of movement of the reflected beam and a microscope objective adjacent the film.

6. In apparatus for recording vibrations on a film or for reproducing vibrations from a film record, a movable film, means for projecting a beam of light toward the film, a lens system for producing a narrow line of light on the film traversed by said beam comprising a cylindrical lens having its axis at right angles to the said narrow line and a spherical lens, a reflecting member arranged in the beam between said lenses, and a viewing screen upon which an enlarged image of said line of light is reflected by said member.

7. In apparatus of the character described, a movable film, a source of light, and means for focusing light from the source in a narrow band on the film comprising a cylindrical lens having its axis at right angles to the band and a spherical lens between the film and the cylindrical lens.

8. Film sound recording apparatus comprising a film supported for longitudinal movement, means for projecting toward said film a beam of light variable in accordance with the sound to be recorded, a photo-electric device and means arranged in the path of said beam for partially reflecting it to said photo-electric device.

9. Film sound recording apparatus comprising a film supported for longitudinal movement, means for projecting a light beam toward said film, means for vibrating said beam in accordance with the sound to be recorded, a photo-electric cell arranged adjacent said beam, and a member arranged in said beam constructed partially to reflect the rays thereof into said cell.

10. A device for approximately uniform illumination of a slit-shaped field, containing a source of light, a cylindrical lens system of collective effect, whose cylindrical axis is perpendicular to the longitudinal axis of the slit-shaped field, and a spherical lens system of collective effect disposed behind the cylindrical system, the cylindrical system being adapted to project in the main section perpendicular to its cylinder axis, approximately in the entrance pupil of the spherical system, an image of the source of light, and the spherical system being adapted to alone project an image of the source of light approximately in the plane of the field to be illuminated.

11. A device for approximately uniform illumination of a slit-shaped field, containing a source of light, a cylindrical system of collective effect, whose cylindrical axis is perpendicular to the longitudinal axis of the slit-shaped field, and a spherical system of collective effect disposed behind the cylindrical system, the cylindrical system having a diameter allowing the passage of all those rays which are emanated from any point of the source of light to any point of the periphery of the entrance pupil of the spherical system, and being adapted to project in the main section perpendicular to its cylinder axis, approximately in the entrance pupil of the spherical system, an image of the source of light, which is at least as long as the diameter of the said entrance pupil, and the spherical system being adapted to alone project an image of the source of light approximately in the plane of the field to be illuminated.

12. Film sound recording apparatus comprising a film supported for longitudinal movement, means for projecting toward said film light variable in accordance with the sound to be recorded, a photoelectric device and means arranged in the path of said light for partially reflecting it to said photoelectric device.

13. In combination with an optical system for focusing a minute luminous image upon a film sound record, a cylindrical lens so positioned in relation to the remainder of the system as to spread the minute luminous image laterally of the sound record into a linear image.

In witness whereof, I have hereunto set my hand this 25th day of November, 1927.

JOHN B. TAYLOR.